(12) United States Patent
Condon et al.

(10) Patent No.: US 11,816,513 B2
(45) Date of Patent: Nov. 14, 2023

(54) CLEANING TOOL FOR CHIP CARD READER

(71) Applicant: KICTeam, Inc., Auburn, ME (US)

(72) Inventors: John Condon, Summer, ME (US);
Joshua Lee Larsen, Turner, ME (US)

(73) Assignee: KICTeam, Inc., Auburn, ME (US)

( * ) Notice: Subject to any disclaimer, the term of this patent is extended or adjusted under 35 U.S.C. 154(b) by 0 days.

(21) Appl. No.: 17/650,787

(22) Filed: Feb. 11, 2022

(65) Prior Publication Data

US 2022/0258214 A1 Aug. 18, 2022

Related U.S. Application Data

(60) Provisional application No. 63/239,760, filed on Sep. 1, 2021, provisional application No. 63/239,722, filed (Continued)

(51) Int. Cl.
*B32B 3/04* (2006.01)
*B08B 1/00* (2006.01)
(Continued)

(52) U.S. Cl.
CPC .......... *G06K 13/0868* (2013.01); *B08B 1/005* (2013.01); *B08B 1/006* (2013.01); *B08B 3/04* (2013.01); *B08B 7/04* (2013.01); *B08B 9/00* (2013.01); *B32B 3/266* (2013.01); *B32B 5/26* (2013.01); *B32B 7/05* (2019.01);
(Continued)

(58) Field of Classification Search
CPC .. B32B 3/28; B32B 27/12; B32B 3/04; B08B 1/00
See application file for complete search history.

(56) References Cited

U.S. PATENT DOCUMENTS 4,645,699 A 2/1987 Neveu
5,153,964 A 10/1992 Gelardi et al.
(Continued)

FOREIGN PATENT DOCUMENTS

DE 10325217 A1 12/2004
DE 102007016949 A1 10/2007
(Continued)

OTHER PUBLICATIONS

U.S. Appl. No. 17/650,781, filed Feb. 11, 2022, Media Transport Device Cleaning Card With Raised Surface Element.
(Continued)

*Primary Examiner* — Michael D Jennings
(74) *Attorney, Agent, or Firm* — Fox Rothschild LLP (57) ABSTRACT

A cleaning device for cleaning a media transport device includes a core layer, a cleaning surface, and an embossment having at least one surface slit across an extended surface of the embossment. The cleaning device may be manufactured by contacting laminating a cleaning surface to at least one side of a core layer and applying heat and/or pressure to form one or more compressible and resilient embossments. The cleaning device may be used to clean a media transport device by inserting a cleaning tool having a core layer, cleaning surface, and an embossment into a media transport device such that an electrical contact comes in contact with the embossment.

33 Claims, 9 Drawing Sheets

Related U.S. Application Data on Sep. 1, 2021, provisional application No. 63/148,956, filed on Feb. 12, 2021.

(51) Int. Cl.
- *G06K 13/08* (2006.01)
- *B08B 9/00* (2006.01)
- *B32B 7/05* (2019.01)
- *B08B 3/04* (2006.01)
- *B08B 7/04* (2006.01)
- *B32B 3/26* (2006.01)
- *B32B 5/26* (2006.01)

(52) U.S. Cl.
CPC ....... *B32B 2250/03* (2013.01); *B32B 2250/20* (2013.01); *B32B 2432/00* (2013.01)

(56) References Cited

U.S. PATENT DOCUMENTS

| | | | |
|---|---|---|---|
| 6,087,279 A | 7/2000 | Laun | |
| 6,156,407 A | 12/2000 | Neubauer et al. | |
| 6,611,985 B1 | 9/2003 | Neubauer et al. | |
| 7,540,055 B1 | 6/2009 | Bailey | |
| 7,631,390 B1* | 12/2009 | Klein | B32B 3/00 15/210.1 |
| 7,732,040 B2 | 6/2010 | Klein et al. | |
| 7,846,534 B2 | 12/2010 | Bouchard et al. | |
| 8,323,779 B2 | 12/2012 | Bailey et al. | |
| 10,189,650 B1 | 1/2019 | Bailey et al. | |
| 2005/0210610 A1 | 9/2005 | Louie et al. | |
| 2006/0019072 A1* | 1/2006 | Bailey | B32B 27/32 428/174 |
| 2007/0026198 A1* | 2/2007 | Bouchard | B08B 1/00 428/174 |
| 2007/0089511 A1* | 4/2007 | Sasaki | G01P 1/023 73/514.16 |
| 2010/0119765 A1 | 5/2010 | Kabis et al. | |
| 2019/0091731 A1 | 3/2019 | Bailey et al. | |

FOREIGN PATENT DOCUMENTS

| | | |
|---|---|---|
| EP | 0789313 B1 | 1/2003 |
| JP | 2002025022 A | 1/2002 |
| JP | 2008257770 A | 10/2008 |
| JP | 2013020572 A | 1/2013 |

OTHER PUBLICATIONS

Premium Embossed Check Scanner Cleaning Card<br>25 card/box, Advanced Card Technologies (ACT Cleaning cards), Aug. 22, 2019, available at https://www.actcleaningcards.com/catalog/product_info.php/cPath/25/products_id/130.

* cited by examiner

CLEANING TOOL FOR CHIP CARD READER

RELATED APPLICATIONS AND CLAIM OF PRIORITY

This patent document claims priority to and is a continuation of: (i) U.S. provisional patent application No. 63/148,956, filed Feb. 12, 2021; (ii) U.S. provisional patent application No. 63/239,722, filed Sep. 1, 2021; and (iii) U.S. provisional patent application No. 63/239,760, filed Sep. 1, 2021. The disclosures of each priority application are fully incorporated into this document by reference.

BACKGROUND

Many machines have media transport mechanisms that receive printed media into the machine and move the media through one or more sections of the machine to perform various processes on the media. For example, a financial transaction terminal such as an automated teller machine may do any or all of the following steps: (i) receive printed currency notes, checks, receipts, coupons, tickets and other printed media; (ii) align the media to an internal reference; (iii) use a camera and/or other sensors to detect what the media is and/or what is printed on the media; (iv) apply additional printed markings to the media; and/or (v) move the media to an appropriate shuttle, bin or exit port. The terminal may perform some or all of these steps, and/or additional steps. Other machines that include media transport mechanisms include coupon printers, ticket printers, ticket-taking devices and other printed media handling systems.

Figure 1:
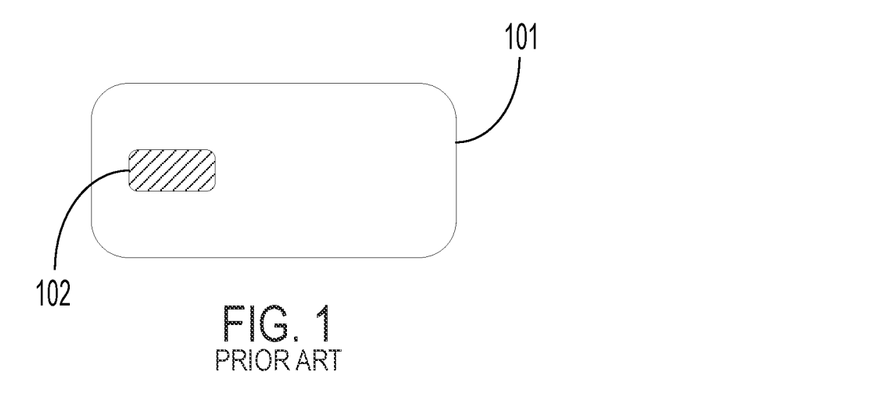
FIG. 1 illustrates components of an example chip transaction card as one exists in the prior art.

For another example, transaction cards, such as credit cards and debit cards, are often used by customers to pay for transactions at a point of sale (POS). For example, as shown in FIG. 1, many such cards 101 include an integrated circuit, generally known as an "EMV chip", "Europay/Mastercard/Visa chip" or simply a "chip" 102, that stores data that the card reader uses to authenticate, authorize and process transactions.

Figure 2A:
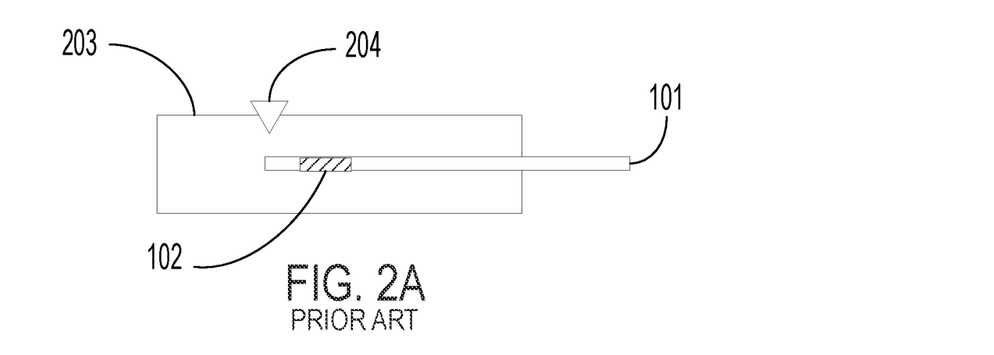
FIGS. 2A-2B illustrate certain elements of a chip card reading device such as is available in the prior art.
Figure 2B:
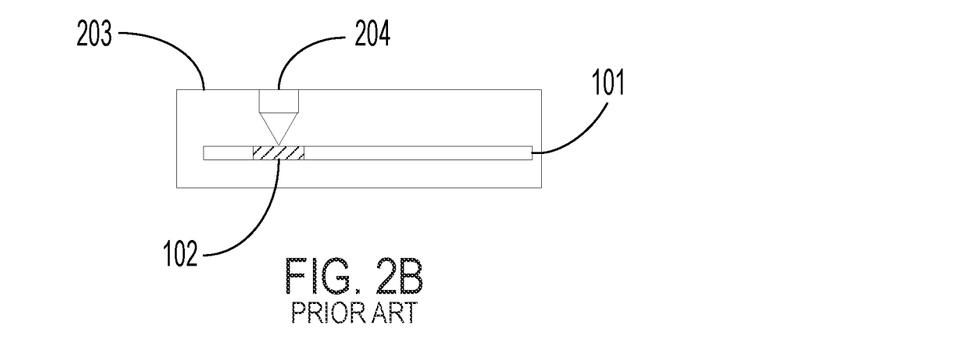

To read an EMV chip card, as illustrated in FIGS. 2A-2B a card reading device includes a housing 203 with a slot that receives the card into the reading device. A sensor inside of the slot detects when the card 101 reaches a reading position inside of the slot. When the card 101 reaches the reading position, a reading head is positioned over or under the area of the card that includes the chip 102. The reading head includes electrical contacts 204 that will move toward the card and interface with the chip 102 to read data from the chip 102. Examples of such card readers are disclosed in, for example, U.S. Pat. Nos. 4,900,273; 6,326,568, and 6,508,673, as well as European Patent Application No. EP0711438, the disclosures of which are fully incorporated into this document by reference.

Other types of card reading devices include that which is known as a "dip reader", in which a chip card is inserted into and quickly retracted from the device, and does not become fully inserted into the device. As a card is inserted into this type of device, it comes in contact with a lever.

Because transaction cards can be handled by human hands and can be exposed to various environmental conditions, the insertion of a card into a card reading device also introduces dirt, oil and/or other contaminants into the card reader slot. When such contaminants touch the reading device's contacts and other components of the reading head, it can impair the device's ability to collect data from the card. Over time, the contaminants can build up on the contacts and other components, and they may cause the reader to malfunction.

Cleaning devices for media transport devices like chip card readers are known. For example, German patent application publication number DE10325217 discloses a card-shaped carrier material with a fiber flock material or a specifically contoured material for cleaning the chips of the card reading device. However, such cleaning cards can be difficult to manufacture, and often must be moved within the device in order to affect a cleaning operation.

This document describes methods and systems directed to solving some of the issues described above, and/or other issues.

SUMMARY

Presented in this disclosure is a cleaning device for cleaning a media transport device. The cleaning device may comprise a cleaning tool having a core layer, a first cleaning surface attached to the core layer, a compressible and resilient embossment that is formed into the core layer and positioned to engage with a component of the media transport device, and a surface slit on the extended surface of the embossment. The cleaning device may also include internal slits that are perpendicular to or at an oblique angle to the surface slit, and the internal slits may be defined at a first end and second end by a surface slit. The cleaning device may also include an embossment that is at least partially contained within a span of the cleaning tool flanked by a first edge slit and a second edge slit, which may be approximately the same length. The cleaning device may have a surface slit that is shorter than the edge slits of the embossment on which that surface slit is positioned. The cleaning device may also have a support layer that is attached to the core layer and is comprised of a fibrous aramid, a meta-aramid, a cellulosic material, or a polymeric substrate. The cleaning devise may have a cleaning surface made of unbroken loop material. The cleaning device may also have a second cleaning device attached to the second side of the core layer. In cards that have multiple embossments, each embossment may be raised in the same direction with respect to the plane of the cleaning tool, or some of the embossments may extend from the plane in one direction while others extend from the plane in the opposite direction.

Presented in this disclosure is also a method for manufacturing a cleaning tool. The method may include forming a card by contacting a core layer to at least one side of a cleaning surface and applying heat, pressure or both to portions of the card to form compressible and resilient embossments, which may include a portion of the core layer and a corresponding portion of the cleaning surface and may extend from a base plane of the card. The cleaning surface may include an unbroken loop material. The cleaning card may also include a support layer that may be made of a fibrous aramid, a meta-aramid, a cellulosic material, or a polymeric substrate. The method may also include applying a cleaning solution to the cleaning surface. The method may also include cutting slits into the cleaning tool before applying the heat and pressure to the card to form one or more embossments.

Presented in this disclosure is a method for cleaning a media transport device. The method may include inserting a cleaning tool into the media transport device and activating the media transport device such that at least one electrical contact moves to come in contact with a compressible and resilient embossment on the cleaning tool, which extends in a direction perpendicular to the plane of the cleaning tool, causing the embossment to deform. The method may also include deforming the embossment laterally with respect to the electrical contact when the electrical contact comes in contact with the embossment. The method may also include applying a cleaning solution to the cleaning tool before inserting the cleaning tool into the media transport device. The method may also include contacting the embossment with an electrical contact at a location that is approximately one third the length of an edge slit from an edge of the embossment. The method may also include inserting a cleaning tool having an embossment with at least one surface slit, such that the embossment deforms asymmetrically as the cleaning tool is inserted into the media transport device.

BRIEF DESCRIPTION OF THE DRAWINGS

FIG. 3A-3B illustrate an example cleaning tool for a chip card reader.

DETAILED DESCRIPTION

In this document, the singular forms "a," "an," and "the" include plural references unless the context clearly dictates otherwise. The term "comprising" means "including, but not limited to." Similarly, the term "comprises" means "includes, and is not limited to." Unless defined otherwise, all technical and scientific terms used in this document have the same meanings as commonly understood by one of ordinary skill in the art.

In this document, terms that are descriptive of relative position such as "upper" and "lower", "top" and "bottom", "horizontal" and "vertical" and the like are intended to indicate relative positions with respect to the components for which those terms are descriptive, and are not intended to be absolute and require that the component remain in that absolute position in all configurations.

Except where specifically stated otherwise, numeric descriptors such as "first", "second", etc. are not intended to designate a particular order, sequence or position in an overall process or schema, but instead are simply intended to distinguish various items from each other by describing them as a first item, a second item, etc.

The terms "substantially" and "approximately", when used in reference to a value, means a range that is within +/−10% of the value. When used in reference to a feature of an object, such as a substantially planar surface, terms such as "substantially" and "approximately" mean that the primary portion of the object exhibits the feature, although other portions may deviate. For example, a cleaning card in the form of a card from which embossments extend is considered to be a substantially planar surface.

The terms "media transport system" and "media transport device" refer to a set of hardware components that are configured to receive printed media (i.e., a substrate onto which text and/or graphics have been printed) or digital media (such as a chip in a credit card) and move the printed media through one or more modules that perform various processing steps on the printed media, such as position adjustment, sensing, printing and/or delivery to a final destination. Thus, a card reading device as described in the Background section in this application is a type of media transport device. A "currency transport device" or "currency transport system" is a type of media transport device that is configured to process and convey printed financial instruments such as, currency notes, checks, money orders, bank notes and the like, and digital financial instruments such as credit cards. A "currency transport device" or "currency transport system" is a type of media transport device that is configured to process and convey printed financial instruments such as, currency notes, checks, money orders, bank notes and the like, and digital financial instruments such as credit cards.

Figure 3A:
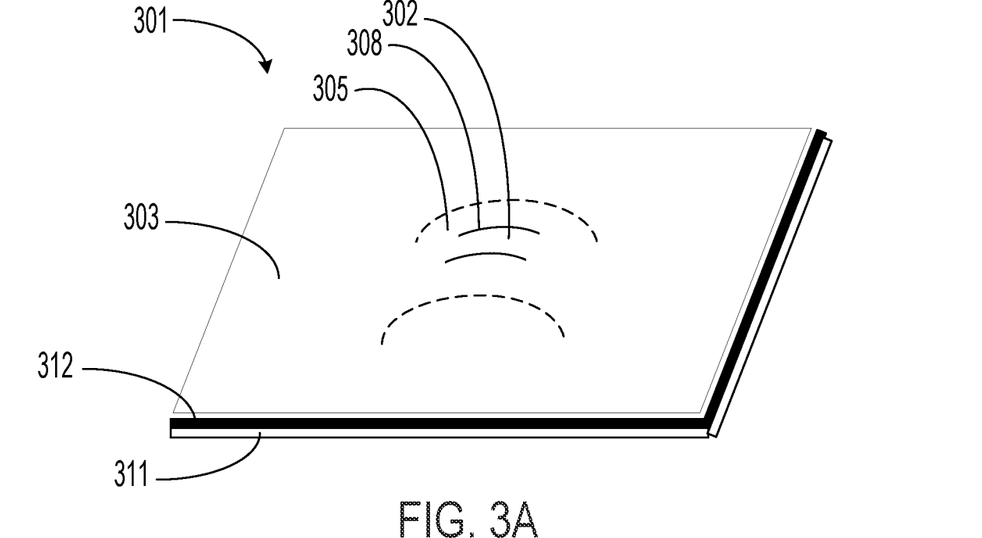
FIG. 3A illustrates a top front perspective view of the cleaning tool.
Figure 3B:
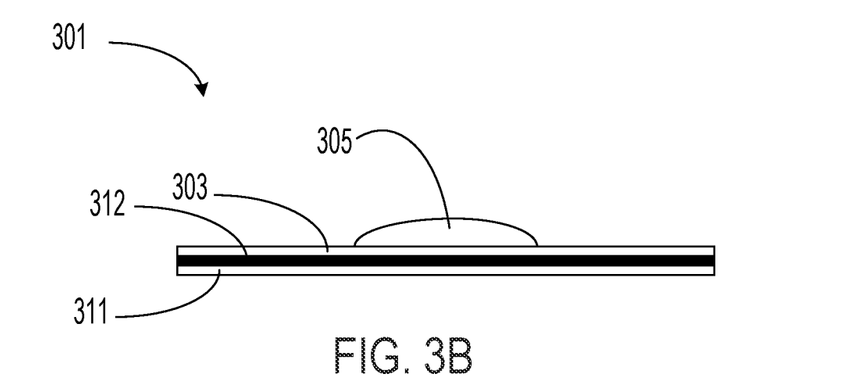
FIG. 3B illustrates a front view of the cleaning tool.
Figure 4:
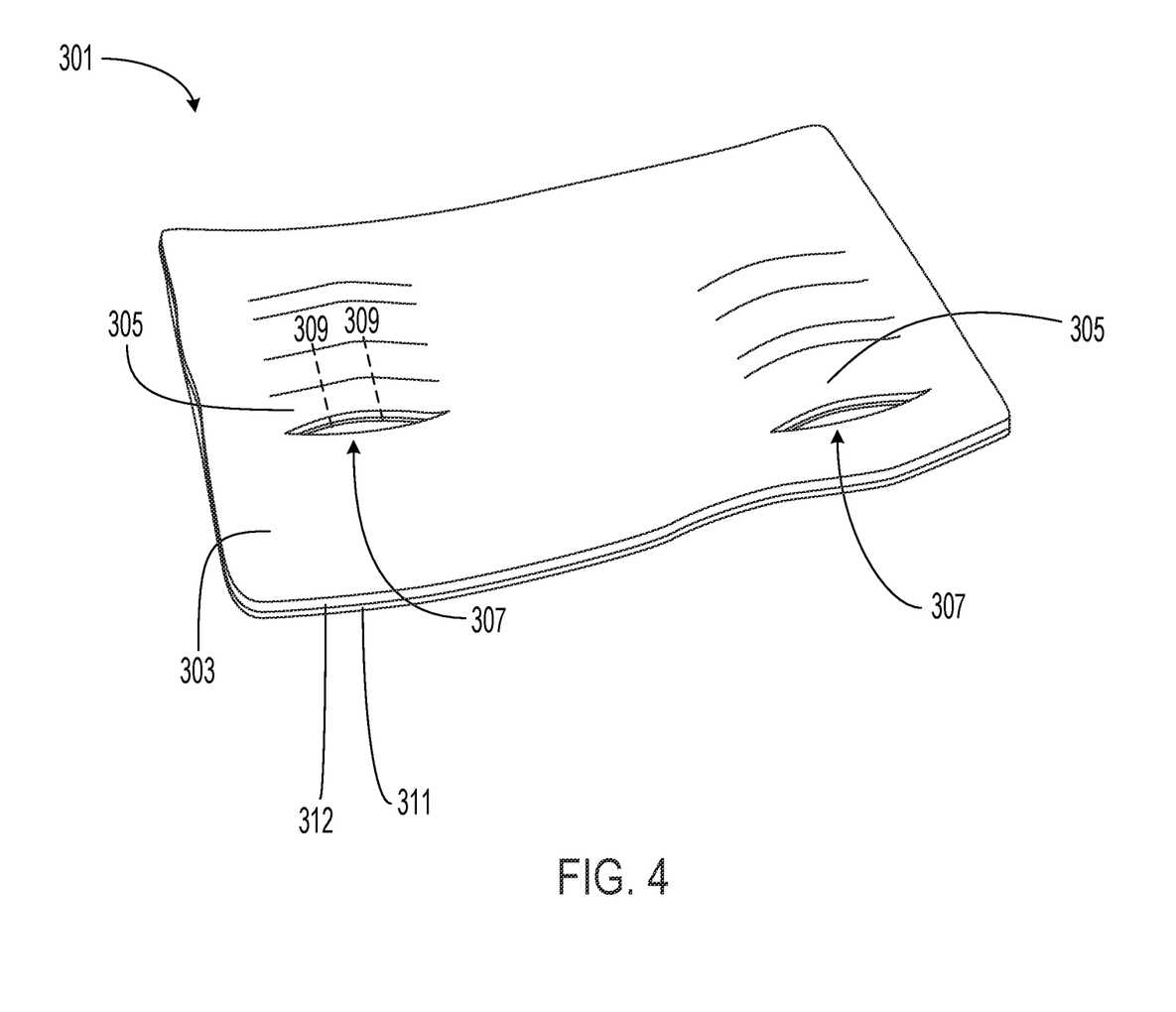
FIG. 4 is a first perspective view of the top of another example cleaning tool for a chip card reader.
Figure 5:
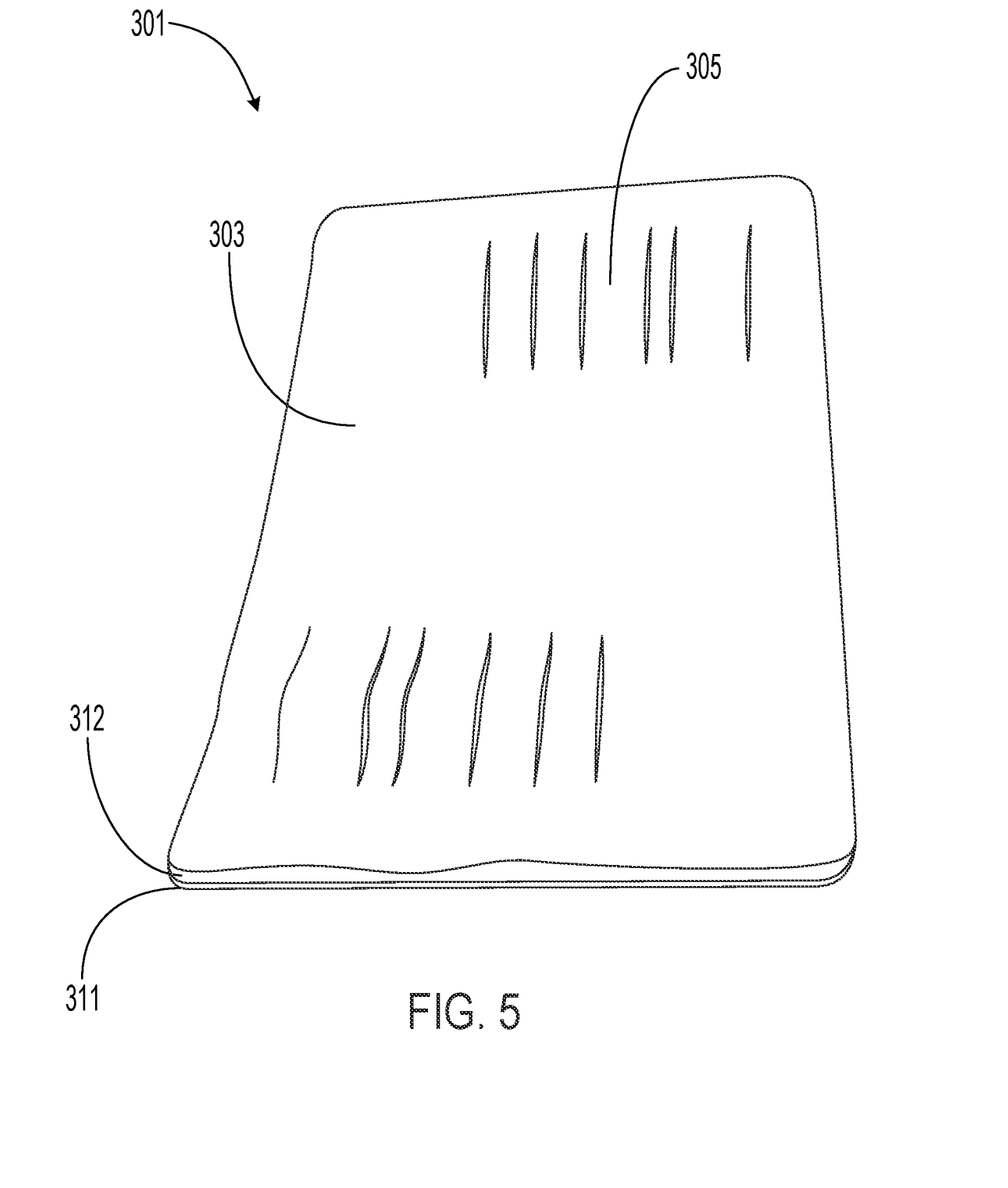
FIG. 5 is a perspective view of the top side of the cleaning tool of FIG. 4.
Figure 6:
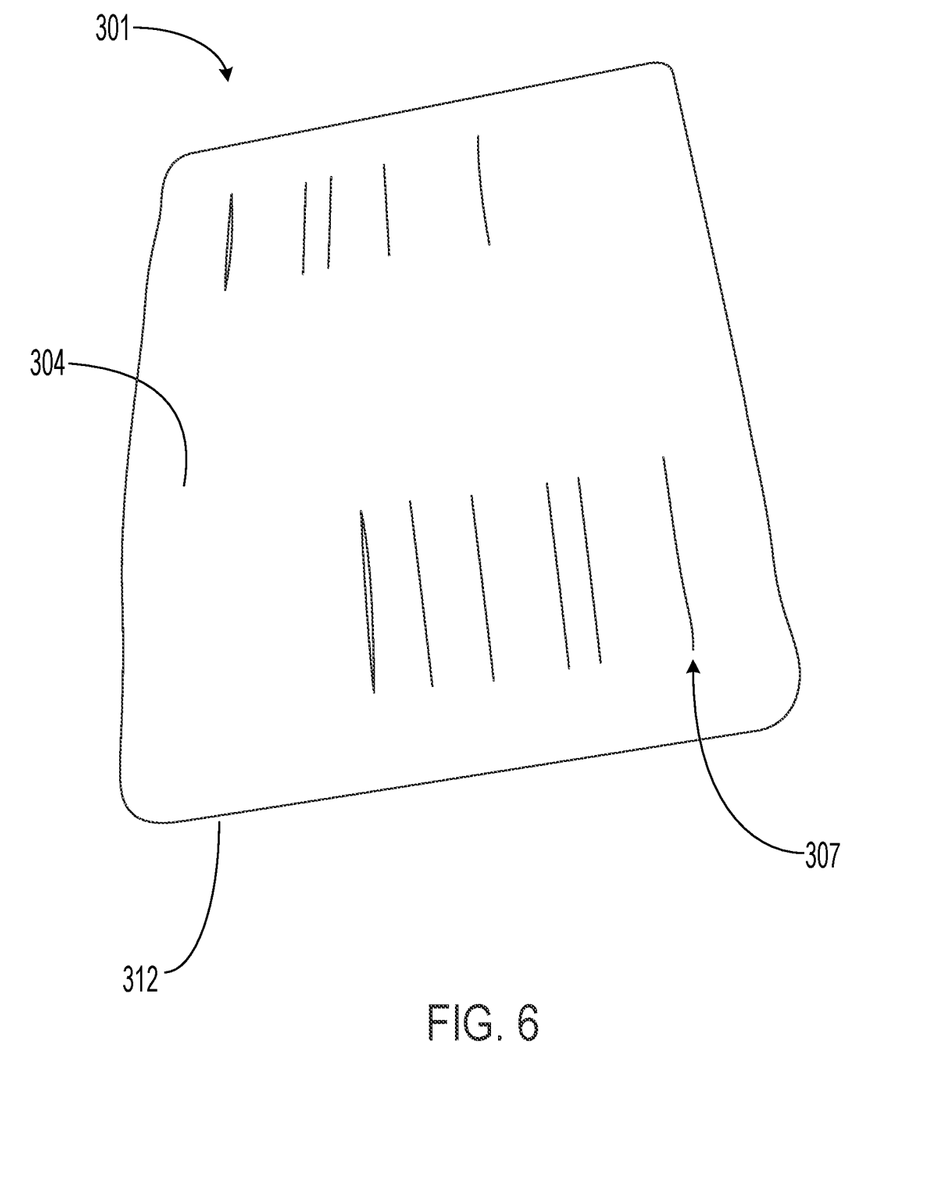
FIG. 6 is a perspective view of the bottom of the cleaning tool of FIG. 4.

FIGS. 3A-3B illustrate an example of a cleaning tool 301 (sometimes referred to in this document as a cleaning device or a cleaning card) for media transport devices, such as chip card readers. FIG. 3A shows the cleaning tool 301 from a top front perspective, while FIG. 3B shows the front of the cleaning tool. The cleaning tool is formed of a card having a substantially planar substrate with certain features described below.

The cleaning tool includes a card with a first cleaning surface 303 (shown as the top layer in FIGS. 3A-3B) and an opposing lower support layer 311. The support layer 311 may be made of a flexible, tear-resistant fibrous material such as a fibrous aramid or meta-aramid fabric material such as that marketed under the NOMEX® brand; a cellulosic material; or a flexible polymeric substrate provided with thin, non-woven layers made of absorbent material such as that marketed under the SONTARA® brand. The material of the support layer 311 may provide a cleaning function as the material may contact and wipe across various components of the media transport device as the cleaning tool moves into and out of the device. The first cleaning surface 303 may be the edge of a core layer 312. Alternatively, the cleaning tool may have a distinct core layer 312. The core layer 312 may be made of any material that is flexible and tear-resistant. For example, the core layer 312 may be made of polyvinyl chloride, polypropylene, polyurethane foam, or any similar material. The core layer 312 may be laminated onto or otherwise contacted to the support layer 311. The first cleaning surface 303 may be made of a soft fabric or other soft material such as unbroken loop (UBL) fabric that is attached to the core layer 312. Other materials may include flocked material or other patterned or textured surfaces that provide a cleaning friction. The support layer 311 may be attached to the core layer 312 opposite the first cleaning surface 303. In certain embodiments, the support layer 311 may be omitted.

Optionally, the cleaning tool also may include a second cleaning surface 304. The second cleaning surface 304 may be formed of a fabric or another texture that provides a cleaning friction. The second cleaning surface 304 may be attached to the support layer 311. Alternatively, the support layer 311 may be omitted, and the second cleaning surface 304 may be directly or indirectly attached to the core layer 312. The first cleaning surface 303 may be directly or indirectly attached to a first side of the core layer 312, and the second cleaning surface 304 may be directly or indirectly attached to a second side of a core layer 312.

The layers of the cleaning tool may have differing thicknesses. For example, the support layer may be thicker than the first cleaning surface. Alternatively, the first cleaning surface may be thicker than the support layer. For example, the support layer 311 may have a thickness of 0.01 to 0.23 inches. The core layer 312 may have a thickness of 0.01 to 0.04 inches. In some embodiments, the overall thickness of the uncompressed cleaning tool may be from 0.010 to 0.240 inches, and when compressed the cleaning tool thickness may be not less than 0.010 inches. Other thicknesses are possible.

In certain embodiments the cleaning tool may have layers of varying stiffness. For example, the support layer 311 may be more rigid than the core layer 312. In addition, the first cleaning surface 303, when made of a material that differs from the core layer 312, may be more rigid than the core layer 312.

In certain embodiments the cleaning tool may have layers of varying compressibility. For example, the support layer 311 may be more compressible than the core layer 312. Alternatively, the core layer 312 may be more compressible than the support layer 311.

The cleaning tool may include at least one embossment 305, which may be partially elevated above the top plane of the cleaning tool. The at least one embossment 305 may be formed into a portion of the core layer and a corresponding portion of the first cleaning surface 303. The at least one embossment 305 may be compressible and resilient. The at least one embossment 305 includes an extended surface that extends toward a peak in a direction perpendicular to the plane of the cleaning tool. The cleaning tool may have embossments 305 that are all oriented in the same direction with respect to the plane of the card. Alternatively, the cleaning tool may have embossments 305 that are oriented in both (i.e., opposing) directions with respect to the plane of the card. The peak of each embossment 305 may be the highest point on the embossment with respect to the plane of the cleaning tool when the card is positioned so that the embossments are raised upward. The peak may be a single point on the embossment 305. The peak may be a ridge on the embossment 305. The peak may be an area of the embossment 305 that is extended furthest from the plane of the cleaning tool with respect to the rest of the embossment. The peak may be large enough to receive an electrical contact of a media transport device. The area surrounding the peak may be rounded, rectangular or otherwise shaped. Alternatively, the peak may form a corner.

Embossments 305 may be patterned to certain locations on the cleaning surfaces of the cleaning tool such that the embossments 305 will come in contact with at least one electrical contact 204 of the chip reading head when the cleaning tool is inserted into a card reading device. The height of the embossment may be sufficient to reach at least one electrical contact before the contact has extended to contact the cleaning tool. Alternatively, the embossment may contact an electrical contact only when the electrical contact is lowered, raised, or otherwise extended into the embossment. The embossments 305 may be an arcuate extension of one or more layers of the cleaning tool. The embossments 305 may be sufficiently flexible such that when the card reader is activated, the electrical contact extends into and deforms the embossment. The card reader may be activated manually, where the extending of the electrical contact is initiated by a user, or the card reader may be activated automatically, where the extending of the electrical contact is initiated automatically when the card is inserted into the card reading device. In various embodiments, the embossment deforms laterally, creating friction between the embossment and the electrical contact. Other structures and use of cleaning cards employing embossments are described in detail in U.S. Pat. No. 8,323,779, the subject matter of which already has been incorporated herein by reference.

As illustrated in FIGS. 3A-3B, one or more of the embossments 305 may have at least one surface slit 308. The surface slit 308 may extend along the raised surface of the embossment. The surface slit 308 may cross the peak of the embossment or the at least one surface slit 308 may be offset from the peak of the embossment. Surface slits 308 may be continuous cuts in the surface of the cleaning tool. Surface slits 308 may be perforations in the surface of the cleaning tool. Surface slits 308 may cut through the entire thickness of the cleaning tool. Alternatively, surface slits 308 may cut partially through the thickness of the cleaning tool. In embodiments having embossments with more than one surface slit 308, the embossment may have at least one subsection 302, which is defined by the space between two surface slits 308. The subsections 302 may be raised in a single direction. The subsections 302 may be raised in different or alternating directions. One or more of the subsections 302 may be positioned to engage with one or more portions of a media transport device. Surface slits 308 may be formed in the card before forming the embossments 305 in the card. Alternatively, surface slits 308 may be formed after forming embossments in the card.

The one or more embossments 305 may have at least one surface slit 308 that increases the flexibility of the embossments when the cleaning device is inserted into a media transport device. In such embodiments, a surface slit 308 may be positioned on an extended surface of the embossment 305 to cause the embossment 305 to deform asymmetrically as the cleaning device is inserted into a media transport device. The at least one component of the media transport device may deform the subsections 302 by differing amounts of deformation. In this way, the one or more surface slits 308 may allow the one or more embossments to deform more easily, allowing the cleaning device to be inserted into the media transport device.

As illustrated in FIGS. 4-8, in some embodiments, embossments 305 may be at least partially contained within a span of cleaning tool flanked by a first edge slit 307 and a second edge slit 307. The embossments 305 may be defined by a span of the cleaning tool flanked on either side by edge slits 307. The edge slits 307 may be substantially parallel to each other. Optionally, the edge slits 307 may be approximately the same length. Alternatively, at least some of the edge slits 307 may have lengths that differ from those of at least some of the other edge slits.

Figure 7:
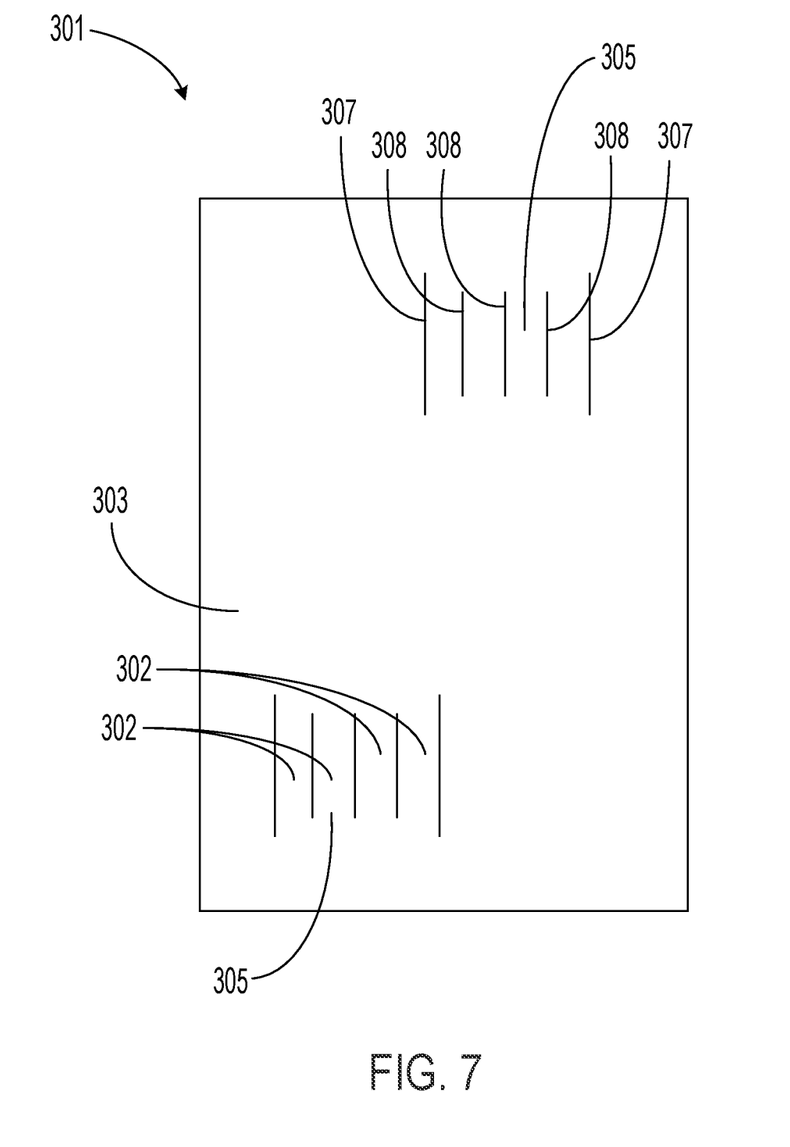
FIG. 7 is a top view of a variation of the example cleaning tool of FIGS. 4-6.

One or more of the embossments 305 may be flanked by edge slits 307 and have at least one surface slit 308. A surface slit 308 may be a slit located on a bulge between two edge slits 307. In some embodiments, surface slits 308 may be oriented parallel to edge slits 307. In such embodiments, the one or more embossments 305 will have subsections 302, each of which is defined by the space between an edge slit 307 and a surface slit 308 or defined by the space between two surface slits 308. The subsections 302 may be raised in a single direction. The subsections 302 may be raised in different or alternating directions. One or more of the subsections 302 may be positioned to engage with one or more portions of a media transport device. Alternatively, in some embodiments, surface slits 308 may be oriented substantially perpendicular or at another angle with respect to edge slits 307. Surface slits 308 may have a length that is shorter than the length of the edge slits 307, as illustrated in FIG. 7. Surface slits 308 may be formed in the card before forming the embossments 305 in the card. Alternatively, surface slits 308 may be formed after forming bulges in the card.

Figure 8:
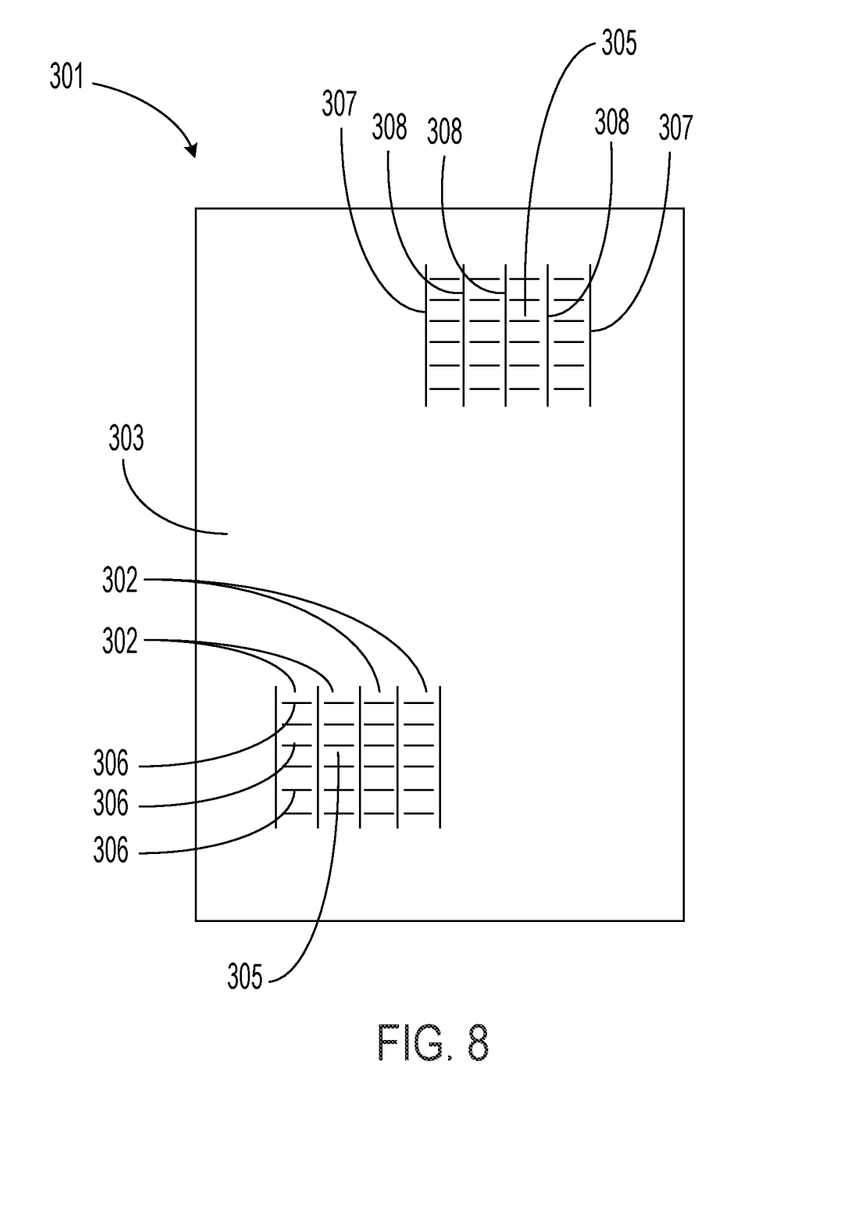
FIG. 8 is a diagram of a top side of another example cleaning tool.

In certain embodiments, as illustrated in FIG. 8, one or more of the embossments 305 may have at least one internal slit 306. In such embodiments, each internal slit 306 may be perpendicular to or positioned at an oblique angle with respect to the edge slits 307. An internal slit 306 may be perpendicular to or positioned at an oblique angle with respect to the surface slit 308 of the embossment on which both appear. The internal slits 306 may be on one or more subsections 302 of the embossment. The internal slit 306 may be between surface slits 308. The at least one internal slit 306 may be between a surface slit 308 and an edge slit 307. The at least one internal slit 306 may be defined by an edge slit 307 or a surface slit 307. The at least one internal slit 306 may be defined at a first end by a first surface slit and at a second end by a second surface slit, the first edge slit, or the second edge slit. One or more of the embossments 305 may have multiple internal slits 306 that are evenly spaced across the one or more embossments. The internal slits 306 may increase the compressibility of the one or more embossments 305. The internal slits 306 may allow the embossment 305 to compress without breaking as the cleaning tool moves through a media transport device.

The cleaning tool may have a longer dimension (i.e., a length) and a shorter dimension (i.e., a width). Typically, the length dimension will be in the direction of travel of the cleaning tool as the cleaning tool moves into and out of the card reader. The edge slits 307 may be oriented parallel to the length of the cleaning tool as shown in FIGS. 4-8. Alternatively, some or all of the edge slits 307 may be oriented perpendicular to the length of the cleaning tool. The electrical contact may come in contact with any portion of the embossment 305 when the cleaning tool is inserted into the card reader. In certain embodiments the electrical contact may come in contact with the embossment at a portion that is not at the center of the embossment 305. In other embodiments, the electrical contact may come in contact with the embossment at a location approximately one third the length of the edge slit 307 from the edge of the embossment 309 (see FIG. 4).

The cleaning tool may be manufactured by first obtaining a material for the support layer 311 (when included) and forming the core layer 312 by laminating or otherwise contacting or applying a polyurethane foam to the top of the support layer 311. Optionally, polyurethane core layers may be laminated to both sides of the support layer 311. Cleaning surfaces 303 and/or 304 may then be laminated to the core layer 312 and/or support layer 311. Embossments may be made by applying heat, pressure or both heat and pressure to press the card into the desired shape. Edge slits 307 may be cut into the cleaning tool to define the location of the embossments 305.

The embossments 305 may be bulges (i.e., raised surface elements) that are formed into the card by an embossing process. A die is positioned against the support layer 311 or core layer 312 and pressure is applied to each die while heat is applied to the area of the cleaning tool that the die contacts. By way of example, approximately 20 tons of pressure may be applied with a press, and/or pressure may be applied less than one second under a temperature ranging 190-260 degrees Fahrenheit, such as approximately 210, 220, 225, 230, 235 or 240 degrees. The bulges are then formed as relief areas that extend upward from the base plane of the first cleaning surface 302. The application of heat alters the structure of the core layer so that the natural (relaxed) position of each bulge or embossment 305 is in the extended position. The bulges may therefore also be referred to as "embossments" 305 in this document, and the terms "bulge", "embossment" and "raised surface structure" all refer to the same general type of structure. Each embossment 305 will compress when pressure is applied to the top of the bulge. Each embossment 305 will return to its relaxed and extended position when the pressure is removed, and thus exhibit resiliency. In embodiments having edge slits, edge slits 307 may cut along the sides of each bulge or embossment 305. Alternatively, edge slits 307 may be formed in the cleaning tool 301 die is positioned against the support layer 311 between each edge slit pair, and pressure is applied to each die while heat is applied to the area of the cleaning tool that the die contacts. This will be described in more detail in the discussion of FIGS. 9A and 9B.

As an alternative to embossing with pressure and heat, the bulges may be formed into the cleaning tool via a molding process. For example, the support layer 311 may be cut and placed into a mold that includes ridges at the places where bulges will be located, and the core layer 312 may be formed over the lower support layer while positioned in the mold. The foam will then cure in the bulge formations, so that they are compressible and resilient. The first cleaning surface 303 may then be placed over the core layer.

The cleaning tool 301 may include other structures that are designed to help remove dirt from other card reader receiving pathway components. Such structures may include additional slots, embossments, scarifying holes, or patterned structures such as that disclosed in: (a) U.S. Pat. No. 7,540,055, titled "Cleaning Cards for Internal Surfaces of Machine Components"; (b) U.S. Pat. No. 7,846,534, titled "Cleaning Cards with Angled Cleaning Surfaces"; (c) U.S. Pat. No. 7,732,040, titled "Patterned Cleaning Card and Method of Manufacturing Same"; (d) U.S. Pat. No. 8,323,779, titled "Cleaning Cards"; and/or (e) U.S. Pat. No. 10,189,650 "Card for Cleaning Printed Media Transport System and Method of Using Same", the disclosures of which are each fully incorporated into this document by reference. Such structures may be on the upper layer 312, the lower layer 311, or both. Optionally, some portions of the cleaning faces of the cleaning tool may be coated with or otherwise contain an adhesive material to help retain dirt or other particles upon contact.

Optionally, At least one of the layers may be coated with a cleaning solution such as a solvent so that internal components of the media transport system may be cleaned when the components move along or across the cleaning face of the substrate. Example cleaning solutions include isopropyl alcohol, deionized water, alkaline surfactants, and other materials or combinations of these. Alternatively, a cleaning face may be textured or made of fiber that will promote friction when a movable object is moved against the cleaning face.

As noted above, FIGS. 2A and 2B illustrate components of an example card reading device that include a housing 203, and moveable electrical contacts 204 that are in a retracted position (as in FIG. 2A) before the card 101 is completely inserted into the housing. When the reader detects that the card 101 is fully inserted into the housing 203, the contacts 204 will extend and touch the chip 102 to read data from the chip.

Figure 9A:
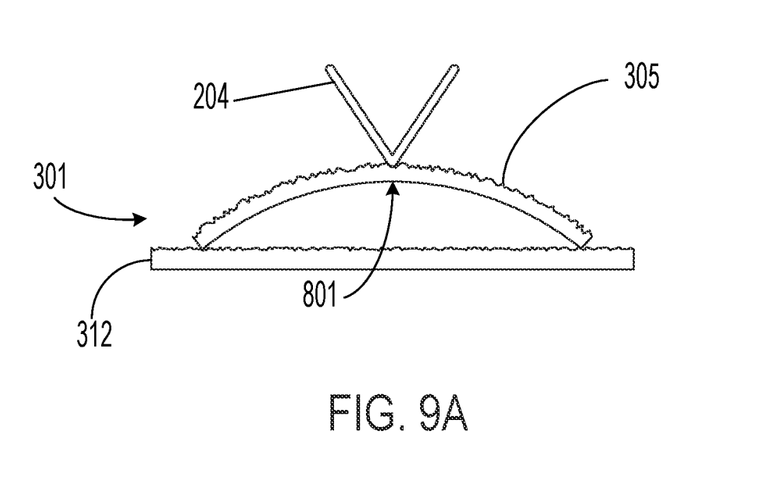
FIGS. 9A-9B illustrate a process of using a cleaning tool such as that of FIGS. 3-8.
Figure 9B:
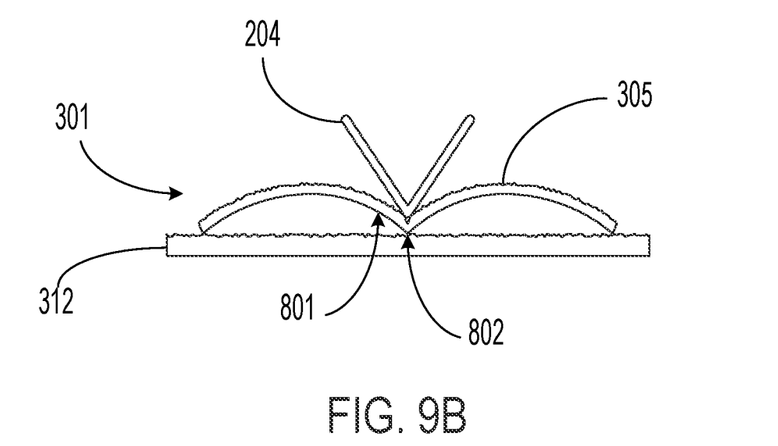

FIGS. 9A and 9B illustrate how the cleaning ridges (i.e., the embossments 305) of the cleaning tool may move during a card cleaning operation. FIG. 9A shows that when a cleaning tool is placed under a contact 204, an embossment 305 extending up from the first cleaning surface 303 of the cleaning tool will be positioned under the contact 204. Alternatively, the embossment 305 may extend downward if the contact is positioned below the card. The contact 204 may then extend toward the cleaning tool and touch the embossment 305 at a first touch point position 801 that is slightly off-center. In other words, the first touch point may not be at the highest point or peak of the bulge, but instead may be at a position that is shifted away from the peak by a distance that is no more than the width of the top of the contact, or by another appropriate distance. As the contact 204 extends and moves further into the embossment 305, FIG. 9B shows that the embossment 305 will not compress in a symmetric manner. Instead, as the contact 204 moves further into the embossment 305, the touch point will shift to position 802, so that the first touch point 801 moves up along the contact's side and wipes the contact.

The process described in FIGS. 9A-9B may apply to other types of card reading devices in which elements of the card come into contact with contact elements of the reading device. For example, as discussed above in a device known as a "dip reader", a chip card is inserted into and quickly retracted from the device, and the card does not become fully inserted into the device. As a card is inserted into this type of device, it comes in contact with a lever. With the height of the ridges (i.e., the embossments), the pins will touch the cleaning tool at this point. As the cleaning tool is inserted further into the device, the pins extend, and the ridges of the tool will scrub the pins as the tool moves into the card. In FIGS. 9A and 9B the pins may correspond to contact 204, with FIG. 9B showing the cleaning tool 301 in a fully inserted position. The scrubbing process repeats as the pins retract when the card is moved out from the device.

Figure 10:
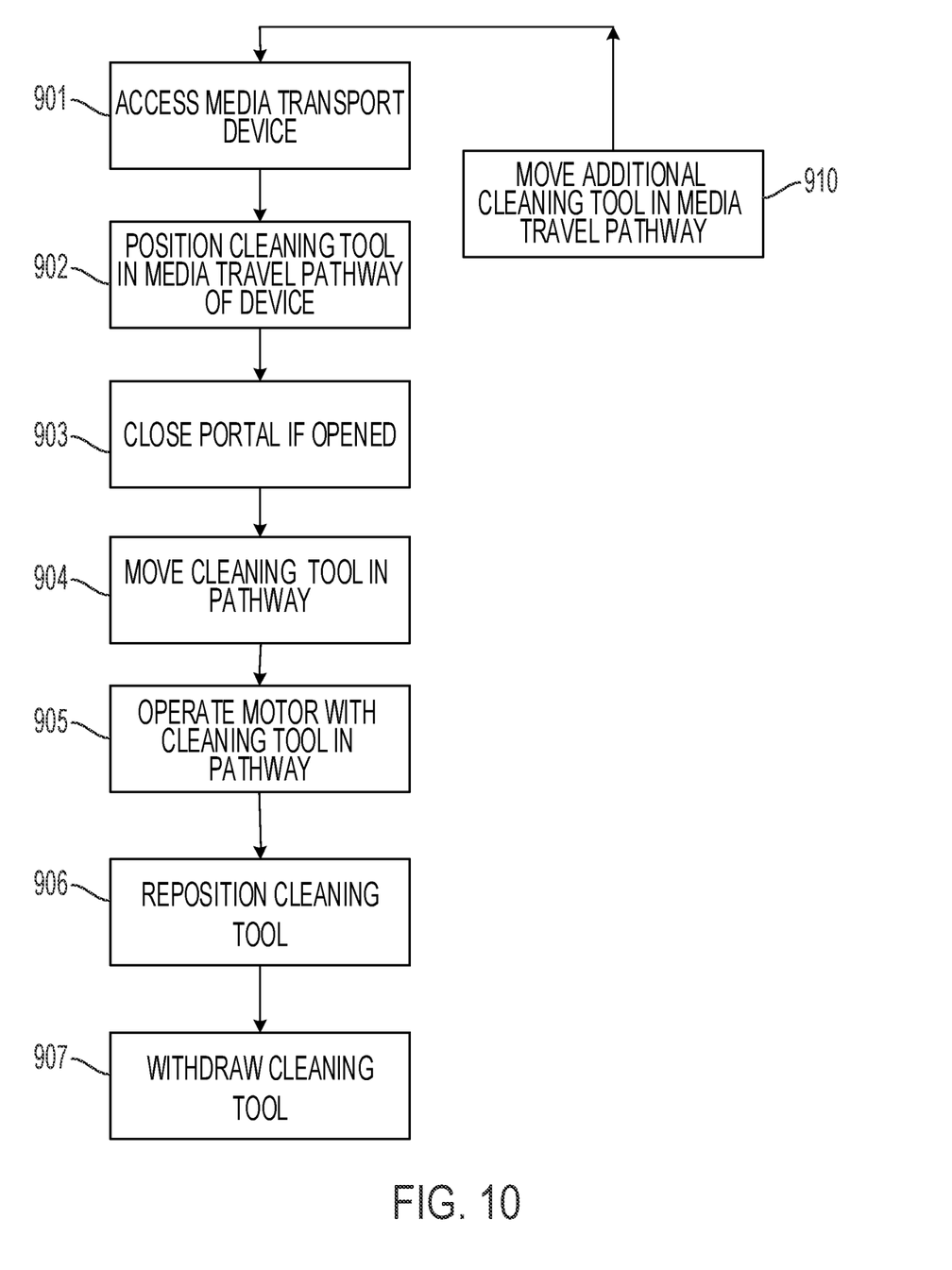
FIG. 10 is a flow diagram illustrating a method of using a cleaning tool of a type consistent with those shown in FIGS. 3-8.

FIG. 10 further illustrates an additional method of using a cleaning tool such as that described above. The method includes opening the media transport device to form a portal into which a first cleaning tool may be placed (step 901). The portal may be formed by opening one or more of the modules that form the media travel pathway. The cleaning tool will be inserted into a media travel pathway of the media transport device through the portal, and the cleaning tool will be placed into a fixed position without operating the motor that actuates the media conveyors (i.e., belts and/or rollers) of the media transport device (step 902).

If the cleaning tool includes embossments, the embossments may be aligned to rollers, belts, sensors and/or other selected components of the media transport device that are in the media travel pathway.

A first section of the media transport device will thus receive the cleaning tool through the portal. The cleaning tool may remain fully within the media travel pathway. Alternatively, a portion of the cleaning tool may extend out from the media travel pathway, such as through a currency acceptor slot, so long as enough of the cleaning tool remains within the pathway to provide a cleaning function.

Optionally, one or more additional cleaning tools may be placed into additional sections of the media travel pathway of the media transport device (step 903) as described above.

The portal to the first section will then be closed (step 904) so that at least some of the belts or rollers contact the first cleaning tool. The media transport device will then be turned on and operated so that the belts or rollers move, contact the first cleaning tool and are cleaned while the first cleaning tool remains substantially fixed within the first section of the media transport device (step 905). The device will then be turned off (i.e., powered down or moved to an idle mode in which the belts and rollers of the media travel pathway are not operated), and portal(s) will be opened to remove the cleaning tool(s) from the media travel pathway (step 907).

Optionally, before opening the first section and placing the cleaning tool through the portal, the method may include operating the media transport device and, while operating the motor, placing a second cleaning tool (step 910) that includes a cleaning solution into a second portal that is accessible during operation of the motor so that the second cleaning tool is received into, and moves through the media transport device, and the cleaning solution contacts the belts or rollers while the second cleaning tool moves through the media transport device. In this way, cleaning solution may be applied to the media travel pathway before the stationary card is inserted, and the stationary card may then require little or no cleaning solution. This also may help pre-clean the components of the media travel pathway before the stationary cleaning tools are inserted.

Optionally, after operating the media transport device so that the belts or rollers turn, contact the first cleaning tool and are cleaned (step 905), the method may include opening the portal to expose access to a section of media travel pathway and repositioning the cleaning tool to a second position in the section according to a second alignment positions (step 906). That portal may then be closed, and the media transport device will be again operated so that at least some of the belts or rollers turn, contact the cleaning tool and are further cleaned while the cleaning tool remains substantially fixed in the second position.

The methods and systems described above may result in significant time savings as compared to manual cleaning. In addition, they can help ensure that cleaning occurs in small and/or hard-to-reach segments within the media transport device.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A cleaning device for cleaning a media transport device, the cleaning device comprising:
   a cleaning tool having a length and a width defining a plane of the cleaning tool and comprising:
      a core layer;
      a first cleaning surface attached to a first side of the core layer; and
      an embossment formed into a portion of the core layer and a corresponding portion of the first cleaning surface, wherein the embossment includes an extended surface, is compressible and resilient, is raised toward a peak in a direction perpendicular to the plane of the cleaning tool, and is positioned to engage with at least one component of the media transport device when the cleaning tool is inserted into the media transport device;
   wherein:

the embossment further comprises a surface slit on the extended surface of the embossment, the embossment is at least partially contained within a span of the cleaning tool flanked by a first edge slit and a second edge slit that are substantially parallel to each other, and the surface slit is shorter than the edge slits.

2. The cleaning device of claim 1, wherein the embossment further comprises an internal slit, wherein the internal slit is positioned perpendicular to or at an oblique angle with respect to the surface slit.

3. The cleaning device of claim 2, wherein the internal slit is defined at a first end by the surface slit and at a second end by an additional surface slit that is on the extended surface of the embossment.

4. The cleaning device of claim 1, further comprising a support layer attached to the core layer opposite the first cleaning surface, wherein the support layer comprises a fibrous aramid, a meta-aramid, a cellulosic material, or a polymeric substrate.

5. The cleaning device of claim 1, wherein the first cleaning surface comprises an unbroken loop material.

6. The cleaning device of claim 1, further comprising a second cleaning surface directly or indirectly attached to a second side of the core layer.

7. The cleaning device of claim 1, wherein the first edge slit and the second edge slit are of approximately equal lengths.

8. The cleaning device of claim 1, further comprising:

a plurality of additional embossments that are compressible and resilient, and each of which includes an additional surface slit on an extended surface, and wherein all of the embossments are raised in a single direction with respect to the plane of the cleaning tool.

9. A method for manufacturing a cleaning tool, the method comprising:

forming a card having a length and a width defining a plane of the cleaning tool by contacting a core layer to at least one side of a cleaning surface; and applying heat and pressure to one or more portions of the card to form one or more compressible and resilient embossments, wherein each of the embossments:

includes and is formed into a portion of the core layer and a corresponding portion of the cleaning surface, includes an extended surface that extends from a base plane of the card, is raised toward a peak in a direction perpendicular to the plane of the cleaning tool, and is positioned to engage with at least one component of a media transport device when the cleaning tool is inserted into the media transport device;

wherein:

at least one of the embossments further comprises a surface slit on the extended surface of the at least one embossment, the at least one embossment is at least partially contained within a span of the cleaning tool flanked by a first edge slit and a second edge slit that are substantially parallel to each other, and the first edge slit and the second edge slit are of approximately equal lengths.

10. The method of claim 9, wherein the cleaning surface comprises an unbroken loop material.

11. The method of claim 9, further comprising contacting a support layer to the core layer, wherein the support layer comprises a fibrous aramid, a meta-aramid, a cellulosic material, or a polymeric substrate.

12. The method of claim 9, further comprising applying a cleaning solution to the cleaning surface.

13. The method of claim 9, further comprising cutting the surface slit, the first edge slit and the second edge slit into the cleaning tool before applying the heat and the pressure to the portions of the card to form the embossments.

14. A method for cleaning a media transport device comprising:

inserting a cleaning tool into the media transport device, wherein the cleaning tool has a length and a width defining a plane of the cleaning tool, and the cleaning tool comprises:

a core layer, a first cleaning surface attached to a first side of the core layer, and an embossment formed of a portion of the core layer and a corresponding portion of the first cleaning surface, wherein the embossment includes an extended surface, is compressible and resilient, is raised toward a peak in a direction perpendicular to the plane of the cleaning tool, and is positioned to engage with at least one electrical contact when the cleaning tool is inserted into the media transport device, wherein the embossment further comprises:

a surface slit on the extended surface of the embossment, and an internal slit that is positioned perpendicular to or at an oblique angle with respect to the surface slit; and activating the media transport device such that the at least one electrical contact of the media transport device moves to come in contact with the embossment, causing the embossment to deform.

15. The method of claim 14, wherein when the electrical contact comes in contact with the embossment, the embossment moves laterally with respect to the electrical contact.

16. The method of claim 14, further comprising applying a cleaning solution to the cleaning tool before inserting the cleaning tool into the media transport device.

17. The method of claim 14, wherein the electrical contact comes in contact with an embossment at a location that is approximately one third the length of an edge slit from an edge of the embossment.

18. The method of claim 14, wherein:

the surface slit causes the embossment to deform asymmetrically as the cleaning tool is inserted into the media transport device.

19. A cleaning device for cleaning a media transport device, the cleaning device comprising:

a cleaning tool having a length and a width defining a plane of the cleaning tool and comprising:

a core layer, a first cleaning surface attached to a first side of the core layer, and an embossment formed into a portion of the core layer and a corresponding portion of the first cleaning surface, wherein the embossment includes an extended surface, is compressible and resilient, is raised toward a peak in a direction perpendicular to the plane of the cleaning tool, and is positioned to engage with at least one component of the media transport device when the cleaning tool is inserted into the media transport device; and wherein the embossment further comprises:

a surface slit on the extended surface of the embossment, and an internal slit that is positioned perpendicular to or at an oblique angle with respect to the surface slit.

20. The cleaning device of claim 19, wherein the internal slit is defined at a first end by the surface slit and at a second end by an additional surface slit that is on the extended surface of the embossment.

21. The cleaning device of claim 19, wherein the embossment is at least partially contained within a span of the cleaning tool flanked by a first edge slit and a second edge slit that are substantially parallel to each other.

22. The cleaning device of claim 19, further comprising a support layer attached to the core layer opposite the first cleaning surface, wherein the support layer comprises a fibrous aramid, a meta-aramid, a cellulosic material, or a polymeric substrate.

23. The cleaning device of claim 19, wherein the first cleaning surface comprises an unbroken loop material.

24. The cleaning device of claim 19, further comprising a second cleaning surface directly or indirectly attached to a second side of the core layer.

25. The cleaning device of claim 19, wherein the first edge slit and the second edge slit are of approximately equal lengths.

26. The cleaning device of claim 19, further comprising:
a plurality of additional embossments that are compressible and resilient, and each of which includes an additional surface slit on an extended surface, and
wherein all of the embossments are raised in a single direction with respect to the plane of the cleaning tool.

27. A cleaning device for cleaning a media transport device, the cleaning device comprising:
a cleaning tool having a length and a width defining a plane of the cleaning tool and comprising:
a core layer,
a first cleaning surface attached to a first side of the core layer, and
an embossment formed into a portion of the core layer and a corresponding portion of the first cleaning surface, wherein the embossment includes an extended surface, is compressible and resilient, is raised toward a peak in a direction perpendicula to the plane of the cleaning tool, and is positioned to engage with at least one componen of the media transport device when the cleaning tool is inserted into the media transport device;
wherein:
the embossment further comprises a surface slit on the extended surface of the embossment,
the embossment is at least partially contained within a span of the cleaning tool flanked by a first edge slit and a second edge slit that are substantially parallel to each other, and
the first edge slit and the second edge slit are of approximately equal lengths.

28. The cleaning device of claim 27, wherein the embossment further comprises an internal slit, wherein the internal slit is positioned perpendicular to or at an oblique angle with respect to the surface slit.

29. The cleaning device of claim 28, wherein the internal slit is defined at a first end by the surface slit and at a second end by an additional surface slit that is on the extended surface of the embossment.

30. The cleaning device of claim 27, further comprising a support layer attached to the core layer opposite the first cleaning surface, wherein the support layer comprises a fibrous aramid, a meta-aramid, a cellulosic material, or a polymeric substrate.

31. The cleaning device of claim 27, wherein the first cleaning surface comprises an unbroken loop material.

32. The cleaning device of claim 27, further comprising a second cleaning surface directly or indirectly attached to a second side of the core layer.

33. The cleaning device of claim 27, further comprising:
a plurality of additional embossments that are compressible and resilient, and each of which includes an additional surface slit on an extended surface, and
wherein all of the embossments are raised in a single direction with respect to the plane of the cleaning tool.

* * * * *